No. 678,298. Patented July 9, 1901.
J. D. KEILEY.
BRAKE MECHANISM.
(Application filed June 14, 1901.)
(No Model.)
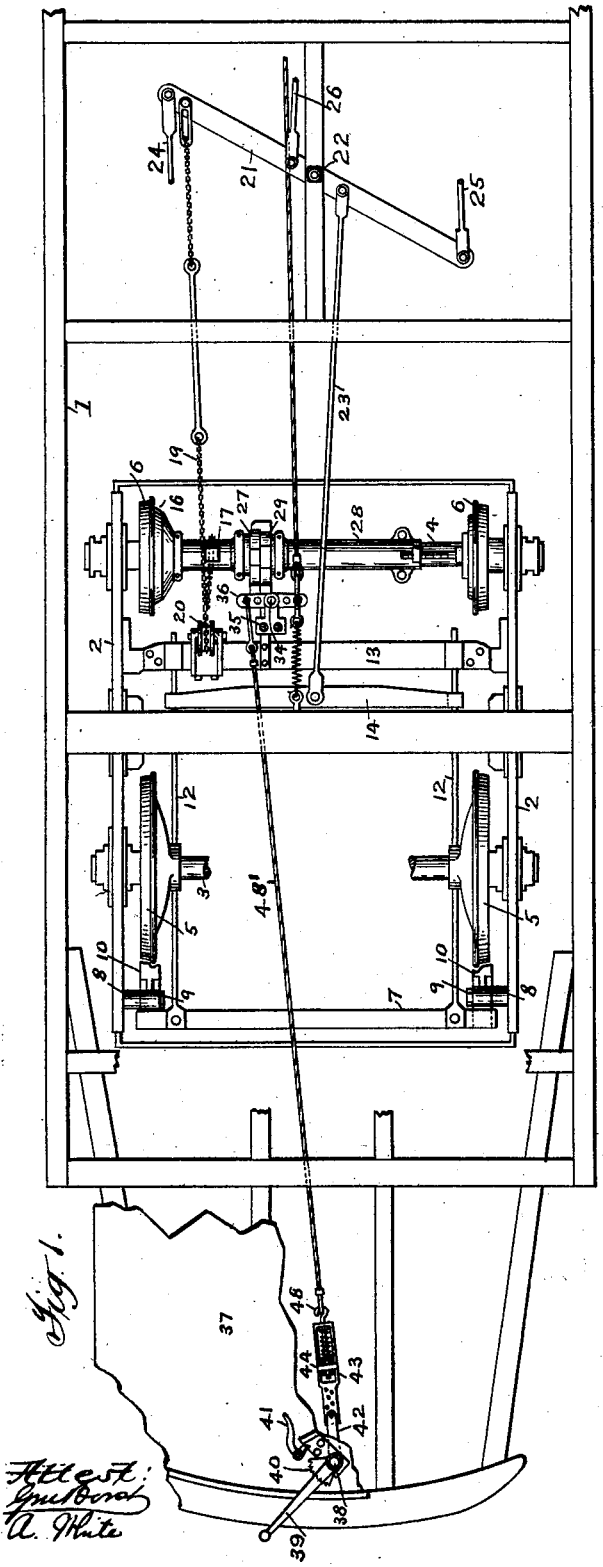
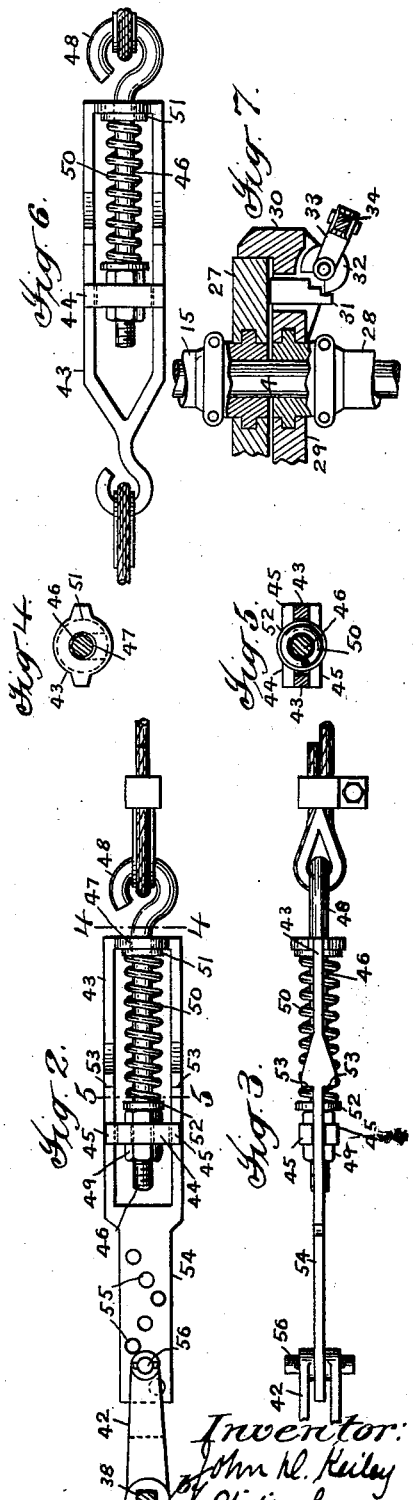

UNITED STATES PATENT OFFICE.

JOHN D. KEILEY, OF NEW YORK, N. Y., ASSIGNOR OF ONE-HALF TO CHARLES B. MARTIN, OF SAME PLACE.

BRAKE MECHANISM.

SPECIFICATION forming part of Letters Patent No. 678,298, dated July 9, 1901.

Application filed June 14, 1901. Serial No. 64,530. (No model.)

*To all whom it may concern:*

Be it known that I, JOHN D. KEILEY, a citizen of the United States, residing at New York, county of Kings, and State of New York, have invented certain new and useful Improvements in Brake Mechanisms, fully described and represented in the following specification and the accompanying drawings, forming a part of the same.

This invention relates to certain improvements in brake mechanisms for tram-cars and other similar vehicles.

In brake mechanisms for tram-cars as now usually constructed, and more particularly in those mechanisms in which the brake is applied by a friction mechanism which is actuated from one of the wheels of the car, it is difficult, if not impossible, to properly graduate or control the force of the brake. In such mechanisms the motorman or other person in charge of the car operates the brake lever or controller, which in turn operates the devices by which the friction mechanism is forced against the wheel to actuate the brake. It frequently happens, however, that it is desirable to apply the brake with sufficient force to control or check the movement of the car, but not with sufficient force to bring it to a stop. The movement which is given the friction devices to throw them against the wheel is, however, slight, so that the extent of movement it is necessary to give the lever or controller in order to set the brake is also slight, and it has been found difficult and in most cases practically impossible for the motorman to so control the movement of his brake-lever as to bring the brakes to bear on the wheels with a slight pressure in order to check without stopping the car. Where friction-brakes are employed, therefore, the result is that the brakes are applied with practically their full force or the car is run without brake control. Furthermore, when the brake is applied it comes into action very quickly, and the car is stopped with a sudden jerk. Furthermore, in arranging the connections between the brake-controller and the brake-applying mechanism it is desirable to have them taut in order that when the brake is applied in making an emergency stop, for instance, valuable time will not be lost in operating the brake-controller to take up slack.

It is one of the objects of this invention to produce an improved brake mechanism in which the brake may be operated so that the car may be run under the control of the brake without bringing it to a stop and so that the brake may be applied easily, thus avoiding the sudden jerk in stopping heretofore referred to.

A further object of the invention is to produce an improved brake mechanism in which a taut line of connections may be established and maintained between the brake-controller and the brake-applying mechanism.

With this and other objects in view the invention consists in certain constructions and in certain parts, improvements, and combinations, as will be hereinafter fully described and then pointed out in the claims hereunto appended.

In the accompanying drawings, which form a part of this specification, and in which like characters of reference indicate the same parts, Figure 1 is a plan view of so much of a car-frame and trucks as is necessary to illustrate the invention. Figs. 2 and 3 are top and side elevations, respectively, of the improved form of yielding connection employed. Figs. 4 and 5 are sections of the construction shown in Fig. 2, the planes of section being indicated by the lines 4 4 and 5 5, respectively. Fig. 6 is a view of a slightly-modified form of the connection. Fig. 7 is a detail view of the devices for moving the friction-sleeve.

Referring to the drawings, which illustrate one embodiment of the invention, 1 indicates a part of the car-frame, which frame may be of any usual or desired construction. The truck-frame is indicated at 2. This truck-frame serves to support the front axle 3 and the rear axle 4, these axles in turn supporting the usual wheels 5 and 6.

The brake mechanism employed may be of any usual or desired construction. In the form of the devices shown a brake-beam 7 is shown as pivoted to studs 8 and 9, extending inward from the sides of the truck-fame. This brake-beam 7 carries the usual brake-shoes 10 and is rocked backward and forward in order to bring the brake-shoes against the wheels, the construction being of an ordinary form.

Any suitable connections may be employed to enable the rocking movement of the brake-beam to be effected. In the construction shown the beam has connected thereto rods 12, which pass through guides in a cross-bar 13, mounted in the truck-frame, and have secured to them a cross-beam 14. It is obvious that as the cross-beam is slid forward and back the brakes will be applied or released, as the case may be.

Any suitable means may be employed for producing the reciprocating movement of the cross-beam. Preferably, however, this movement will be effected through a friction mechanism which derives its power from one of the wheels of the car. While any suitable or desired form of friction mechanism may be employed, it will preferably embody a sleeve 15, loosely mounted on the rear axle 4, said sleeve having secured to it a friction-plate 16, which is adapted to be forced against the surface of one of the car-wheels 6. It is obvious that when the sleeve is moved lengthwise of the axle, so as to force the plate 16 against the wheel, the sleeve will turn with the wheel.

Any suitable form of connections may be used to transmit the movement of the sleeve to the cross-beam 14. In the construction shown the sleeve has secured to it a pin 17, and to this pin is secured a chain or other flexible connection 19. The chain is preferably passed over a sheave 20, which is supported in suitable bearings on the cross-bar 13 of the truck-frame, and is then led back to a sway-lever 21, pivoted at 22 to the car-frame. This sway-lever is connected by means of a link 23 to the cross-beam 14. It is obvious, therefore, that when the sleeve is caused to rotate the chain 19 will be wound around it, thus moving the sway-lever 21 and causing the movement of the cross-beam 14, which, through the connections before described, applies to brake. This sway-lever 21 is a common feature of car-brake constructions now ordinarily used and is usually provided with means which enable it to be operated independently of the brake mechanism. Inasmuch, however, as these means form no part of this invention, they are not shown, although they are indicated by broken links 24 and 25, attached to the ends of the sway-lever.

It will of course be understood that both trucks of the car will be equipped with brake mechanism. Inasmuch, however, as the brake mechanism for the other truck will be a duplicate of that shown, it is not illustrated. The sway-lever 21 has, however, a link 26 attached thereto, which link is supposed to lead to the cross-beam which operates the other set of brakes.

Any suitable means may be employed for effecting the movement of the sleeve 15. In the construction shown, however, (see Fig. 7,) the sleeve has mounted thereon a disk 27, which is connected to the sleeve in any suitable manner, as by a tongue-and-groove construction, such as shown. A second sleeve 28 is mounted on the axle 4, said sleeve serving to support a disk 29, which is located alongside the disk 27 and which has or may have projections 30 extending over the edges of said disk 27 in order to guide it in its movement. Mounted in a suitable opening in the disk 29 is a stepped pin 31, the steps being provided for the purpose of adjustment, said pin being engaged by a cut-away disk 32, which is pivoted at 32' to the disk 29. This disk 32 is rigidly secured to an arm 33, which is connected to the lower end of an upright shaft 34. The upper end of this shaft 34 (see Fig. 1) is loosely mounted in a bracket 35, supported on the car-frame 13, and its upper end carries a two-armed lever 36. As the two-armed lever 36 is swung it will be seen that the lower end of the shaft 34, the arm 33, and the disk 32 will turn about the pivot 32' of the disk 32, and this disk 32 will cause the stepped pin 31 to move inward and will push the disk 27 away from the disk 29. This will produce a longitudinal movement of the sleeve 15 on the axle and force the friction-plate 16 against the face of the wheel 6.

The car is shown as provided with the usual platform 37, said platform serving to support any desired form of brake-controlling mechanism. As shown, this mechanism consists of the usual vertical shaft 38, provided with a hand-lever 39 and with the usual toothed segment 40, which is engaged by a dog 41 to hold the shaft in any adjusted position. The shaft is further provided with an arm 42, and this arm is suitably connected to the lever 36.

It will be readily seen that the movement of the sleeve 15 and its attached plate 16 between the point where the plate 16 is close to but not touching the wheel and the point where the plate is bearing with its full force against the wheel is very small. In order, however, to apply the brakes lightly, so that the car may be partially checked, but not stopped in its movement, it is necessary to so move the sleeve that the plate will be positioned between these points, or, in other words, so that the plate may bear against the wheel, but may slip thereon under the reactive force of the brakes.

Since the movement of the lever is produced by the movement of the brake-lever, it necessarily follows that the manipulation of this lever, in order to position the sleeve between the two points referred to, must also be very slight. It has been found that it is practically impossible for the ordinary motorman working under ordinary conditions to effect the delicate manipulation referred to. To overcome this difficulty, however, a yielding connection is established between the brake-applying device and the friction mechanism. It is furthermore important, especially in making emergency stops, that the line of connections between the brake-applying device and the friction mechanism shall be taut, as if this is not the case the initial movement of the brake-applying device, instead of operating on the friction mechanism, will be consumed in taking up slack, and valuable time will be lost. For this reason, therefore, the yielding connection introduced in this line of connections and the arrangement of the line itself should be of such a character as to maintain the line taut when the brake is off. Where, as will usually be the case, a spring is employed in the yielding connection, it will be so arranged as to be maintained under tension, and the line of connections between the brake-controller and the friction mechanism being preferably taut the spring will thus act to keep them in this condition.

The yielding connection employed may be varied widely in form and construction. As shown, it consists of a stirrup-block 43, in the opening of which is located a cross-head 44, having guiding-flanges 45, which take over the sides of the block. To this cross-head 44 there is preferably connected a stem 46, said stem 46 passing through an opening 47 in the end of the stirrup-block 43 and terminating in a hook 48. The connection between the stem and the cross-head is effected by locking and adjusting nuts 49 or in any other suitable manner.

Suitable means are provided for controlling the movement of the cross-head 44. These means will preferably consist of a suitably-arranged spring. In the construction shown this spring, which is marked 50, encircles the stem 46 and bears at one end against a washer 51, which is located at the rear end of the stirrup-block. The other end of the spring bears against a washer 52, which surrounds the stem. A series of such washers which vary in thickness will preferably be provided, so that any given washer may be removed and a thicker washer substituted therefor when it is desired to increase the tension of the spring, or a plurality of washers may be employed for this purpose, if desired. Should any adjustment less than that which is produced by a change in washers be desired, it can be effected by means of the adjusting-nut 49.

In checking the movement of the car in making the ordinary stop the action of the spring or equivalent means through the line of connections will usually be sufficient to throw the friction mechanism into action sufficiently to operate the brakes and stop the car. In making an emergency stop, however, it is not desirable to depend upon the yielding action of the spring or an equivalent device. In such cases it is desirable that the connections between the brake-applying device and the friction mechanism be rigid or non-yielding, so that the friction mechanism shall be held against the car-wheels with all the power which the motorman is capable of applying to the brake-applying device. Means are accordingly provided which limit the movement of the parts of the yielding connection. While these means may be varied widely in form, they preferably consist of shoulders 53, which are integral with the sides of the stirrup-block and which limit the movement of the cross-head. In making an ordinary stop, therefore, the spring alone will ordinarily be utilized to operate the friction mechanism; but in making an emergency stop the spring will be immediately compressed to such a point as will allow the cross-head to move up against and be stopped by the shoulders 53, upon which the line of connection between the brake-applying device and the friction mechanism becomes a rigid one.

In the construction shown the hook 48 on the stem 46 is connected by means of a wire cable 48' to the lever 36, although any suitable form of connection may be employed. While, furthermore, the stirrup-block may be connected to the arm 42 by means of a wire cable or other similar device, such a construction being indicated in Fig. 6, the preferred form is that in which the front end of the stirrup-block is formed as a plate 54, said plate having a series of perforations 55. The end of the arm 42 is formed to provide a yoke, between the members of which the end of the plate passes, a pin 56 passing through the members of the yoke and through any one of the perforations in the plate, according to the adjustment it is desired to effect. The adjustment will, however, be such that the line of connections between the brake-controller and the brake-applying lever 36 will be kept taut, the spring 50 being, as beforesaid, maintained under a slight tension for this purpose in order that when the brake is to be applied the initial movement of the brake-controller will at once tend to operate the friction mechanism.

By introducing a yielding connection between the brake-applying device or controller and the brake mechanism it will be seen that when the motorman in making an ordinary stop swings his brake-handle to apply the brakes the plate 16, before referred to as part of the friction mechanism, will be yieldingly forced against the face of the wheel, since the movement of the lever-arm 42 on the brake-shaft is transmitted to the lever 36 through the spring 50 and the cable 48'. The reactive force set up by the pull of the brake-shoes when they rest against the wheel upon the sleeve 15 through the connections described will cause the plate 16 to slip on the wheel. The force by which the friction-plate 16 is held against the wheel will of course depend upon the compression of the spring 50. In making an emergency stop, however, the motorman operates his brake-handle so rapidly and to such a degree that the cross-head in its movement is almost immediately caused to strike the limiting-shoulders 53. The connection from the brake-controller to the friction mechanism thus becomes rigid, and the plate 16 will be unyieldingly held against the wheel. When, therefore, the motorman desires to slow down the car without bringing it to a sudden stop, he will move his brake-handle so that the pull produced thereby will only partly compress the spring 50, or, in other words, so that the cross-head will not be moved against its limiting-shoulders. This will apply the brakes yieldingly to the wheels, the amount of force depending upon the amount of compression of the spring. When, however, he desires to fully stop the car, he will throw the handle so as to fully compress the spring, thus bringing the cross-head against its limiting-shoulders and establishing a rigid connection from the brake-handle to the friction mechanism. Since, furthermore, the line of connections between the brake-controller and the brake-applying mechanism is maintained taut, the brake begins to be applied as soon as the controller is moved, so that no time is lost in taking up slack. It will furthermore be seen that by varying the strength of the spring or by adjusting it by means of the washers the force by which the friction-plate is held against the wheel can be completely controlled.

The means by which the invention is carried into effect may be varied within wide limits. It is to understood, therefore, that the invention is not to be limited to the specific devices hereinbefore described.

What is claimed is—

1. The combination with a brake mechanism, of a brake-controller, and connecting means between the brake mechanism and the brake-controller, said means including a yielding connection the parts of which are maintained under tension, the construction being such that a taut line of connections is formed between the brake-controller and the brake mechanism, substantially as described.

2. The combination with a brake mechanism, of a friction mechanism for throwing the brake mechanism into operation, a brake-controller, and connecting means between the controller and the friction mechanism, said means including a yielding connection the parts of which are maintained under tension, the construction being such that a taut line of connections is formed between the brake-controller and the brake mechanism, substantially as described.

3. The combination with a vehicle, of a brake mechanism therefor, a friction mechanism actuated from one of the wheels of the vehicle for operating the brake mechanism, a brake-controller, and means whereby the brake-controller throws the friction mechanism into operation, said means including a yielding connection the parts of which are maintained under tension, the construction being such that a taut line of connections is formed between the brake-controller and the brake mechanism, substantially as described.

4. The combination with a brake mechanism, of a brake-controller, connecting means between the controller and the brake mechanism, and a device capacitated to permit a limited yielding movement located in said connecting means, substantially as described.

5. The combination with a brake mechanism, of a friction mechanism for throwing the brake mechanism into operation, a brake-controller, connecting means between the controller and the friction mechanism, and a device capacitated to permit a limited yielding movement located in said connecting means, substantially as described.

6. The combination with a vehicle, of a brake mechanism therefor, a friction mechanism actuated from one of the wheels of the vehicle for operating the brake mechanism, a brake-controller, means whereby the brake-controller throws the friction mechanism into operation, and a device capacitated to permit a limited yielding movement located in said connecting means, substantially as described.

7. The combination with a brake mechanism, of a brake-controller, and connecting means between the brake mechanism and the brake-controller, said means including a yielding connection, the parts of which are maintained under tension and which are capacitated to have a limited yielding movement, the construction being such that a taut line of connections is formed between the brake-controller and the brake-applying mechanism, substantially as described.

8. The combination with a brake mechanism, of a friction mechanism for throwing the brake mechanism into action, a brake-controller, and connecting means between the brake-controller and the friction mechanism, said connecting means including a yielding connection, the parts of which are maintained under tension and which are capacitated to have a limited yielding movement, the construction being such that a taut line of connections is formed between the brake-controller and the brake-applying mechanism, substantially as described.

9. The combination with a vehicle, of a brake mechanism therefor, a friction mechanism actuated from one of the wheels of the vehicle for operating the brake mechanism, a brake-controller, and connecting means between the brake-controller and the friction mechanism, said connecting means including a yielding connection the parts of which are maintained under tension and which are capacitated to have a limited yielding movement, the construction being such that a taut line of connections is formed between the brake-controller and the brake-applying mechanism, substantially as described.

10. The combination with a brake mechanism, of a brake-controller, and connecting means between the controller and the brake mechanism, said means including a spring connection, the spring being maintained under tension, and the construction being such that a taut line of connections is formed between the brake-controller and the brake-applying mechanism, substantially as described.

11. The combination with a brake mechanism, of a friction mechanism for throwing the brake mechanism into operation, a brake-controller, and connecting means between the controller and the friction mechanism, said means including a spring connection, the spring being maintained under tension, and the construction being such that a taut line of connections is formed between the brake-controller and the brake-applying mechanism, substantially as described.

12. The combination with a vehicle, of a brake mechanism therefor, a friction mechanism actuated from one of the wheels of the vehicle for operating the brake mechanism, a brake-controller, and means whereby the brake-controller throws the friction mechanism into operation, said means including a spring connection, the spring being maintained under tension, and the construction being such that a taut line of connections is formed between the brake-controller and the brake-applying mechanism, substantially as described.

13. The combination with a brake mechanism, of a brake-controller, connecting means between the controller and the brake mechanism, a connection including a spring maintained under tension located in said connecting means, the construction being such that a taut line of connections is formed between the brake-controller and the brake-applying mechanism, and means for adjusting the tension of the spring, substantially as described.

14. The combination with a brake mechanism, of a friction mechanism for throwing the brake mechanism into operation, a brake-controller, connecting means between the controller and the friction mechanism, a connection including a spring maintained under tension located in said connecting means, the construction being such that a taut line of connections is formed between the brake-controller and the brake-applying mechanism, and means for adjusting the tension of the spring, substantially as described.

15. The combination with a vehicle, of a brake mechanism therefor, a friction mechanism actuated from one of the wheels of the vehicle for operating the brake mechanism, a brake-controller, means whereby the brake-controller throws the friction mechanism into operation, a connection including a spring maintained under tension located in said connecting means, the construction being such that a taut line of connections is formed between the brake-controller and the brake-applying mechanism, and means for adjusting the tension of the spring, substantially as described.

16. The combination with a vehicle, of a brake mechanism, a friction mechanism for operating the brake mechanism, said mechanism being actuated from one of the wheels of the vehicle, a brake-controller, connections between the controller and the friction mechanism, said connections including two members movable with relation to each other, and a spring maintained under tension for controlling the movement of the members, substantially as described.

17. The combination with a vehicle, of a brake mechanism, a friction mechanism actuated from one of the wheels of the vehicle for operating the brake mechanism, a brake-controller, connections between the controller and the friction mechanism, said connections including two members movable with relation to each other, means for limiting the movement of the members toward each other, and a spring for controlling the movement of the members, substantially as described.

18. The combination with a vehicle, of a brake mechanism, a friction mechanism actuated from one of the wheels of the vehicle for operating the brake mechanism, a brake-controller, connections between the controller and the friction mechanism, said connections including two members movable with relation to each other, means for limiting the movement of the members toward each other, and a spring maintained under tension for controlling the movement of the members, substantially as described.

19. The combination with a vehicle, of a sleeve loosely mounted on one of the axles thereof, a friction-surface carried by the sleeve, connections between the sleeve and the brake mechanism, means for moving the sleeve so as to force the friction-surface against one of the wheels, a brake-controller, connecting means between the brake-controller and the means for moving the sleeve, said means including a spring maintained under tension, and the construction being such that a taut line of connections is formed between the brake-controller and the brake-applying mechanism, substantially as described.

20. The combination with a vehicle, of a sleeve loosely mounted on one of the axles thereof, a friction-surface carried by the sleeve, connections between the sleeve and the brake mechanism, means for moving the sleeve so as to force the friction-surface against one of the wheels, a brake-controller, connecting means between the brake-controller and the means for moving the sleeve, said means including two members which are movable with respect to each other, and a spring maintained under tension for controlling the movement, the construction being such that a taut line of connections is formed between the brake-controller and the brake-applying mechanism, substantially as described.

21. The combination with a vehicle, of a sleeve loosely mounted on one of the axles thereof, a friction-surface carried by the sleeve, connections between the sleeve and the brake mechanism, means for moving the sleeve so as to force the friction-surface against one of the wheels, a brake-controller, connecting means between the brake-controller and the means for moving the sleeve, said means including two members which are movable with respect to each other, a spring for controlling the movement, and means independent of the spring for limiting the movement, substantially as described.

22. The combination with a vehicle, of a sleeve loosely mounted on one of the axles thereof, a friction-surface carried by the sleeve, connections between the sleeve and the brake mechanism, means for moving the sleeve so as to force the friction-surface against one of the wheels, a brake-controller, connecting means between the brake-controller and the means for moving the sleeve, and means including two members which are movable with respect to each other, a spring maintained under tension for controlling the movement, and means independent of the spring for limiting the movement, substantially as described.

23. The combination with a brake mechanism, of a brake-controller, a stirrup-block, a cross-head sliding thereon, and a spring maintained under tension for controlling the movement of the cross-head, said block and cross-head being located in a taut line of connections between the controller and the brake mechanism, substantially as described.

24. In a brake mechanism, the combination with a brake-controller, of a friction mechanism, a stirrup-block, a cross-head sliding thereon, means for limiting the movement of the cross-head, a spring maintained under tension for controlling the movement of the cross-head, means whereby the block and cross-head are connected to the controller and the friction mechanism, a brake mechanism, and means whereby the friction mechanism actuates the brake mechanism, substantially as described.

25. In a brake mechanism, the combination with a brake-controller, of a friction mechanism, a stirrup-block, a cross-head sliding thereon, a spring for controlling the movement of the cross-head, stops for limiting this movement, means whereby the block and cross-head are connected to the controller and the friction mechanism, a brake mechanism, and means whereby the friction mechanism actuates the brake mechanism, substantially as described.

26. As a new article of manufacture, a yielding connection for brake mechanisms, consisting of a stirrup-block having shoulders thereon, a cross-head having guiding-flanges which take over the sides of the block, said cross-head being arranged to slide in the block and its movement being limited by the shoulders, a stem connected to the cross-head and sliding through an opening in the block, a spring surrounding the stem, and means for adjusting the spring, substantially as described.

27. The combination with a vehicle, of a brake mechanism, a sleeve mounted on one of the axles of the vehicle, a friction-plate carried by the sleeve and arranged to be forced against one of the wheels of the vehicle, actuating connections between the sleeve and the brake mechanism, means for moving the sleeve so as to force its friction-plate against the wheel and thereby rotate the sleeve, a brake-controller, a stirrup-block, a cross-head sliding in said block, stops for limiting the movement of the cross-head, a stem connected to the cross-head and working through an opening in the block, a spring surrounding the stem, and means for connecting the block and stem to the brake-controller and the means for moving the sleeve, substantially as described.

In testimony whereof I have hereunto set my hand in the presence of two subscribing witnesses.

JOHN D. KEILEY.

Witnesses:
G. M. BORST,
A. A. V. BOURKE.